June 7, 1932. J. HALTENBERGER 1,861,441
SLEEVE VALVE ENGINE
Original Filed Feb. 17, 1927
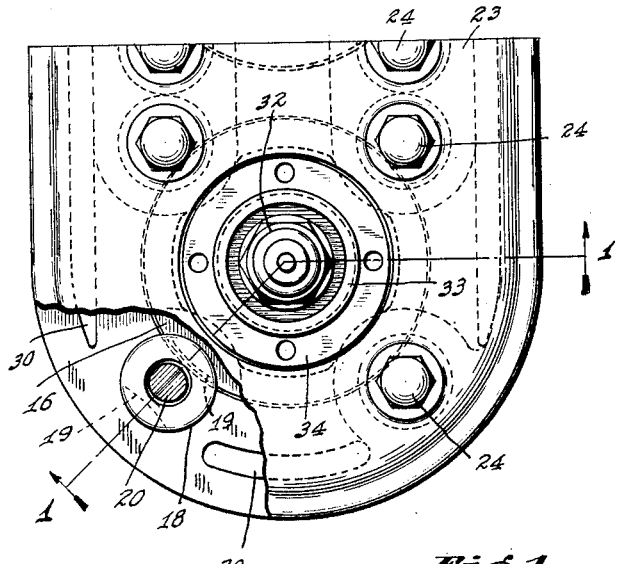
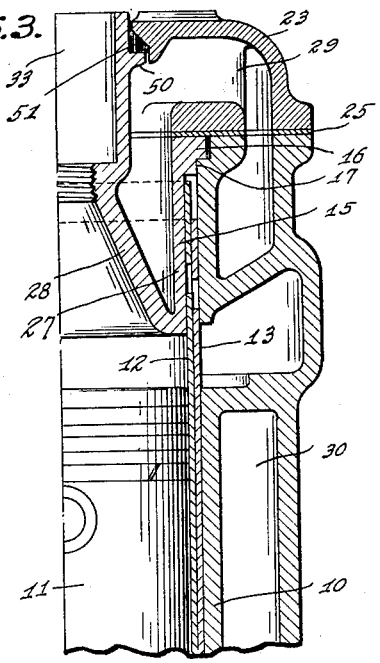
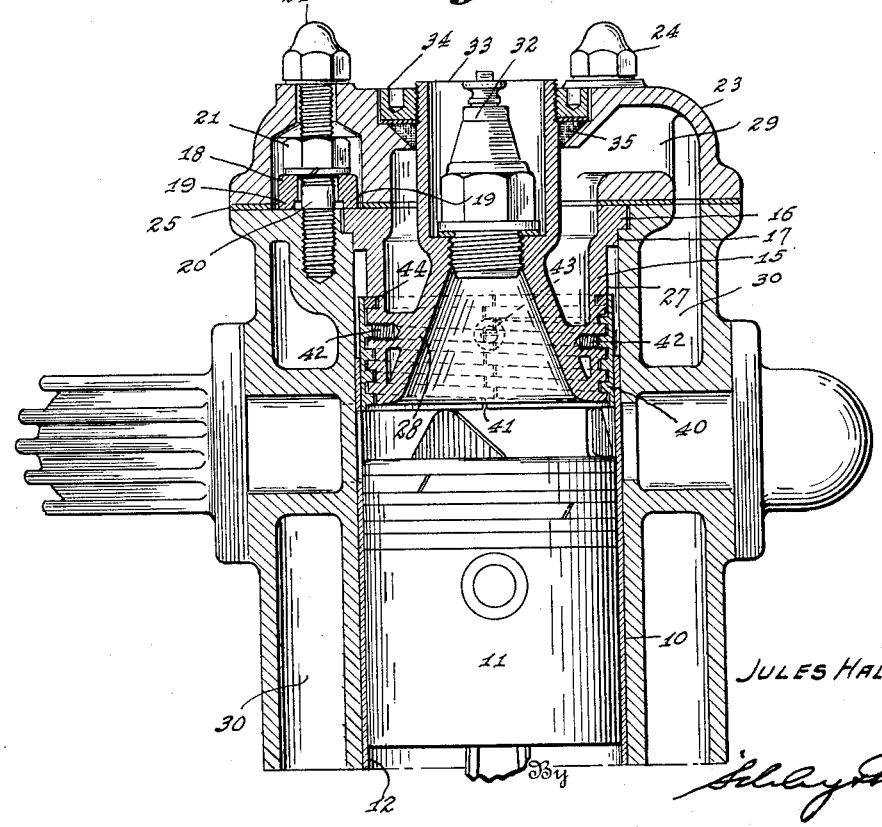
Inventor
JULES HALTENBERGER, Patented June 7, 1932

1,861,441

UNITED STATES PATENT OFFICE

JULES HALTENBERGER, OF INDIANAPOLIS, INDIANA, ASSIGNOR, BY MESNE ASSIGNMENTS, TO CONTINENTAL MOTORS CORPORATION, OF DETROIT, MICHIGAN, A CORPORATION OF VIRGINIA

SLEEVE VALVE ENGINE

Application filed February 17, 1927, Serial No. 168,881. Renewed November 18, 1931.

Internal combustion engines of the sleeve-valve type are commonly provided at the top of each cylinder with an annular space into which the upper end of the sleeve or sleeves projects. This annular space is formed by a plug of smaller diameter than the cylinder bore, which plug projects downward from the upper end of the cylinder sufficiently far to enter the inner sleeve of a double-sleeve-valve engine or the single sleeve in a single-sleeve-valve engine.

In engines so constructed, it is customary to support each of the cylinder plugs either directly or indirectly from the finished upper surface of the cylinder block. As this surface may not be accurately perpendicular to the axis of some or all of the cylinders, It frequently happens that the plug is not accurately concentric with the cylinder throughout the length of the plug. This effect is apt to be accentuated if a compressible gasket intervenes between the cylinder block and the plug or a part to which the plug is attached. If the plug is not concentric with the cylinder, unevenness of wear and loss of compression will follow.

It is the object of my invention to provide in such an engine a construction by which I insure that the plug, throughout its length, will be concentric with the bore of the associated cylinder. A further object of my invention is to provide between the circumferential surface of such plug and the inner surface of the sleeve immediately adjacent to it an improved form of junk ring which will prevent loss of compression. A still further object of my invention is to provide for the axial adjustment of this junk ring to correct for inaccuracies of manufacture and to make possible variations in the valve timing in order that the engine may have optimum performance characteristics.

I accomplish the above objects by providing each of the cylinder plugs with a flange adapted to be supported from and located by a surface which is finished accurately relative to the bore of the associated cylinder. This surface may be one such as would be produced by spot-facing the upper surface of the cylinder block around the cylinder bore with a tool guided from the cylinder bore, but it is preferably the bottom of a counterbore deep enough to receive the entire axial thickness of the plug flange, which counterbore is produced by a tool guided from the associated cylinder bore. On the lower end of the plug, I mount if desired through the medium of screw threads, a junk ring which has considerable axial extent and which may be located in various positions of adjustment to vary the hight of its lower edge and thus to control the valve timing of the engine.

The accompanying drawing illustrates my invention: Fig. 1 is a longitudinal section through an engine cylinder on the line 1—1 of Fig. 2; Fig. 2 is a plan view of one end of a cylinder block of a multi-cylinder engine with part of the cover thereof broken away; and Fig. 3 is a fragmentary vertical section illustrating a modification of my invention.

In the construction illustrated in Figs. 1 and 2, there is a cylinder 10 having associated with it a piston 11 between which and the cylinder a sleeve-valve 12 is provided. Suitable means are provided for imparting movement to the sleeve-valve 12 to control the valve opening and valve closing, such movement preferably having an axial component. Valve-operating means are not shown in the drawing, as they are well known and form no part of this invention.

Extending into the upper end of the cylinder is a circular plug 15 having an external diameter somewhat less than the cylinder bore in order to provide an annular space into which the upper end of the sleeve 12 projects. In carrying out my invention, I provide the plug 15 with an annular flange 16 which is received within a counterbored portion of the cylinder. Preferably below the flange 16 there is provided a pilot 17, the diameter of which is substantially equal to that of the cylinder bore so that the plug, when in place in the cylinder, will be definitely located concentric therewith. The bottom surface of the flange 16 is supported from the bottom of the counterbore which may be finished by a counterboring tool piloted from the cylinder bore, thus insuring that it will be accurately disposed relative to the cylinder axis.

I prefer that the flange 16 will be held downward directly in contact with the bottom of the counter-bore without any intervening gasket material, as I may provide gasket material at another location. To hold the plug in place in the cylinder, I provide clamps which are desirably spaced at equal angular intervals about the axis of the cylinder as is clear from Fig. 2. These clamps are conveniently in the form of blocks 18 having two feet 19 one of which bears against the upper surface of the cylinder and the other one of which bears against the upper surface of the flange 16 of the plug 15. Passing through each of the clamp blocks 18 is a stud 20 which is screw-threadedly mounted in the cylinder 10 and is screw-threaded at its upper end to receive a nut 21 by which the clamp block 18 may be forced downward to hold the plug 15 in place.

Preferably, the studs 20 project upwardly for a considerable distance above the nuts 21 and pass through a cover 23 which may overlie all the cylinders of the cylinder block. Above the cover 23, the studs may be provided with nuts 24 which serve to hold the cover in place.

The cylinder counterbore may be deep enough to receive the entire flange 16 as shown in the drawing or it may be a mere superficial spot-facing sufficient only to provide a surface accurately perpendicular to the cylinder bore. I prefer, however, to make the counterbore deep enough so that the upper surface of the flange 16 will be substantially flush with that of the cylinder block when the plug is in place. I am thus enabled to provide, if desired, between the cover 23 and the cylinder block a gasket 25 which extends over the upper surface of each of the plugs 15 and forms a second seal in addition to that provided by engagement of the flange 16 at the bottom of the cylinder counterbore.

Desirably, the plug 15 is formed with an outer wall 27 and an inner wall 28, the latter being conical in shape and joined at its lower end to the outer wall 27. The space between the outer wall 27 and inner wall 28 is for the reception of cooling water, such space communicating for this purpose with a passage 29 in the cover 23, which passage in turn communicates with the water jacket 30 of the cylinder.

The inner wall 28 of the plug 15 is provided with a screw-threaded opening for the reception of a spark plug 32, such wall continuing upward beyond such opening in the form of a sleeve 33 which projects through the cover 23. The upper end of the sleeve 33 is screw-threaded to provide a mounting for a packing nut 34 which is received in a recess in the upper surface of the cover 23. This recess in the cover 23 surrounds the sleeve 33 and the bottom of the recess is of a conical shape to provide an annular space for the reception of suitable compressible packing 35 which is arranged to be compressed by the tightening of the nut 34.

The construction described has the advantage that the plug 15 is definitely located from a surface which is accurately machined with relation to the bore of the associated cylinder. The plug may contact directly with the wall of the cylinder without any intervening compressible packing which might be compressed unevenly as a result of the uneven tightening of the bolts which hold the plug 15 in place. It is not essential that there be no gasket between the bottom of the counterbore and the flange 16. If a gasket is provided in this location, it may be a thin gasket; and, since it will have a uniform width, it will be compressed equally throughout its circumference and will not tilt the plug 15. Thus I insure that the plug throughout its length will be concentric with the cylinder bore. In the absence of any compressible gasket material between the mating faces of the plug and cylinder, some leakage of gases may occur, but such a leakage is not serious as a secondary seal is provided by reason of the presence of the gasket 25.

This method of mounting the plug, since it insures that the plug will be concentric with the cylinder bore, makes it possible to have the plug directly in contact with the inner surface of a sleeve. Such a construction is illustrated in Fig. 3 in connection with a double-sleeve valve engine having both the sleeve 12, which immediately surrounds the plug 15, and a second sleeve 13 disposed between the sleeve 12 and the inner surface of the cylinder. It will of course be evident that the construction is equally applicable to a single sleeve-valve engine.

If a better seal than that formed by direct contact of the plug with the sleeve is desired, or when the plug 15 is formed of a metal having a relatively high co-efficient of expansion, I may employ the construction illustrated in Fig. 1. In this engine, a junk ring 40 is mounted on the lower end of the plug 15, such junk ring being normally of a larger diameter than the sleeve bore in order that it will spring outward into firm contact with the inner surface of the sleeve. Preferably, the junk ring 40 is mounted on the plug 15 by means of screw threads, as is clear from Fig. 1. The junk ring 40 is slotted axially as shown at 41 in order to obtain radial resilience. It is desirable that the slot 41 be other than a mere straight or oblique slot, and therefore, the slot 41 is staggered to provide a tongue-and-groove joint for the mating ends of the junk ring 40.

The screw-thread mounting of the junk ring 40 permits it to be adjusted to various positions axially of the plug 15, this adjustment serving to vary the timing of valve events. To hold the junk ring 40 in any one of its various positions of adjustment, I may provide along the screw thread in the plug 15 a series of spaced holes 42 any one of which may receive a set screw 43 which projects radially outward into a hole in the junk ring 40, such hole being preferably located at the slot 41.

If desired, the plug 15 may be provided above the screw threads with a plane groove which receives a sealing ring 44 adapted to bear against the inner surface of the junk ring. This prevents the escape of any gases which may find their way through the labyrinth passage formed by the screw threads.

The junk ring which has just been described possesses several advantages. In the first place, it may be adjusted to vary the valve timing in order to correct for inaccuracies in manufacture or for any other purpose. In the second place, the screw threads provide a labyrinth passage which forms an effective seal for the combustion gases. Further, the tongue-and-groove joint at the ends of the ring 40 prevents the escape of combustion gases at this point. Again, the frictional drag of the sleeve 12 on the junk ring 40 as the sleeve reciprocates, due to the screw thread mounting of the junk ring, tends to work the junk ring angularly back and forth through a small distance on the plug 15, and thus prevents the junk ring from "baking" to the plug. In this respect, the helical thread has another advantage in that it permits drainage of any oil which might be trapped between the junk ring and the plug and which after continued heating would cause the junk ring to "bake" to the plug.

In the construction shown in Fig. 3, the junk ring is shown as omitted, but it may be incorporated in such construction if desired. A slightly different form of joint between the cover 23 and sleeve 33 is shown in this figure. In this arrangement, the sleeve 33 is provided within the cover 23 with an external perpiheral flange 50 which lies adjacent the mouth of a downwardly opening recess in the cover 23. Between this flange 50 and the walls of the recess a ring 51 of packing material may be provided which will be compressed when the nuts 24 which hold the cover in place are tightened.

My improved plug mounting may be used in single- or double-sleeve valve engines and it may be used with or without the junk ring. Likewise the junk ring may be used in engines having one or two sleeves or it may be used with any type of plug. A distinct advantage is, however, obtained when the junk ring and my improved plug mounting are used in conjunction.

I claim as my invention:

1. In an internal combustion engine, the combination of a cylinder, a piston reciprocable therein, a sleeve valve located between said piston and the inner surface of said cylinder, a plug for closing the upper end of said cylinder, said plug having within said cylinder a diameter less than the cylinder bore to provide an annular space into which the upper end of said sleeve valve may enter, and a junk ring screw-threadedly mounted on said plug and bearing against the inner surface of said sleeve, said junk ring being adjustable on its screw-thread mounting to vary the hight of its lower edge.

2. In an internal combustion engine, the combination of a cylinder, a piston reciprocable therein, a sleeve valve located between said piston and the inner surface of said cylinder, a plug for closing the upper end of said cylinder, said plug having within said cylinder a diameter less than the cylinder bore to provide an annular space into which the upper end of said sleeve valve may enter, and a junk ring screw-threadedly mounted on said plug and bearing against the inner surface of said sleeve, and means for holding said junk ring in various positions of adjustment on its screw-thread mounting.

In witness whereof, I have hereunto set my hand at Indianapolis, Indiana, this 15th day of February, A. D. one thousand nine hundred and twenty seven.

JULES HALTENBERGER.